(12) United States Patent
Burk et al.

(10) Patent No.: US 7,216,638 B1
(45) Date of Patent: May 15, 2007

(54) CONTROL OF EXHAUST GAS STOICHIOMETRY WITH INDUCTED SECONDARY AIR FLOW

(75) Inventors: Reinhard Burk, Stillwater, OK (US); Brian R. White, Stillwater, OK (US); Claus Bruestle, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/482,082

(22) Filed: Jul. 6, 2006

(51) Int. Cl.
*F02D 41/14* (2006.01)

(52) U.S. Cl. .................. 123/673; 123/676; 60/285

(58) Field of Classification Search ............... 123/673, 123/674, 295, 480, 305; 60/274, 285
See application file for complete search history.

(56) References Cited

U.S. PATENT DOCUMENTS

| | | | |
|---|---|---|---|
| 4,046,118 A | 9/1977 | Aono | 123/119 EC |
| 4,072,137 A | 2/1978 | Hattori et al. | 123/119 DB |
| 4,075,835 A | 2/1978 | Hattori et al. | 60/276 |
| 4,121,546 A | 10/1978 | Hattori et al. | 123/32 EE |
| 4,363,209 A | 12/1982 | Atago et al. | 60/274 |
| 4,561,403 A * | 12/1985 | Oyama et al. | 123/676 |
| 4,593,663 A | 6/1986 | Atago et al. | 123/440 |
| 4,841,940 A | 6/1989 | Uranishi et al. | 123/520 |
| 5,377,654 A * | 1/1995 | LoRusso et al. | 123/673 |
| 5,425,232 A | 6/1995 | Holtermann | 60/272 |
| 5,546,919 A | 8/1996 | Iida et al. | 123/682 |
| 5,957,107 A * | 9/1999 | Kadota | 123/295 |
| 6,460,330 B1 | 10/2002 | Yoshida et al. | 60/300 |
| 6,799,422 B2 | 10/2004 | Westerbeke et al. | 60/289 |
| 7,059,115 B2 | 6/2006 | Yasui | 60/285 |

* cited by examiner

*Primary Examiner*—Hieu T. Vo
(74) *Attorney, Agent, or Firm*—William D. Lanyi

(57) ABSTRACT

A method for operating a marine engine uses four valves to control the flow of secondary air that is inducted into each of the cylinders of an engine. An oxygen sensor is disposed in an exhaust passage downstream from the cylinders and upstream from a catalytic converter. A carburetor is calibrated to provide a richer than stoichiometric air/fuel ratio so that inducted secondary air through the valves associated with each cylinder can result in a stoichiometric ratio of air flowing into each cylinder. The cylinders are each provided with their own valve in order to allow the air/fuel ratios to be equalized for each cylinder regardless of the configuration and geometry of the intake manifold and its associated conduits.

23 Claims, 2 Drawing Sheets

CONTROL OF EXHAUST GAS STOICHIOMETRY WITH INDUCTED SECONDARY AIR FLOW

BACKGROUND OF THE INVENTION

1. Field of the Invention

The present invention is generally related to the control of the air/fuel mixture in an internal combustion engine and, more specifically, to the control of the flow of inducted secondary air streams into the cylinders of the internal combustion engine in such a way that the overall effective air/fuel ratio is stoichiometric.

2. Description of the Related Art

Many different types of fuel control systems are know to those skilled in the art. As an example, U.S. Pat. No. 6,799,422, which issued to Westerbeke, et al. on Oct. 5, 2004, describes an emissions control. A method of controlling emissions from a fixed-speed internal combustion engine includes injecting a controlled flow of air into the exhaust between a first catalyst bed adapted to reduce HC and NOx emissions, and a second catalyst bed adapted to reduce CO emissions. The flow of air is controlled to optimize the level of CO emissions, preferably as a function of engine load or temperature. In a marine engine-generator set, the flow of air is controlled as a function of generator load or temperature of the exhaust mixture entering the second catalyst bed, and seawater is injected into the exhaust stream downstream of the catalysts.

U.S. Pat. No. 6,460,330, which issued to Yoshida et al. on Oct. 8, 2002, describes an engine intake air/fuel ratio control system in outboard engine system. In an engine intake air/fuel ratio control system in an outboard engine system, a secondary air passage for supplying secondary air for regulating the air/fuel ratio of an air/fuel mixture is connected to a carburetor in an intake system of an engine, and a duty control valve is connected to the secondary air passage. A duty control unit is connected to the duty control valve for controlling the duty ratio of a pulse applied to a coil of the duty control valve, and an LAF sensor is mounted to an exhaust system for detecting an air/fuel ratio of an exhaust gas to input a detection signal proportional to the air/fuel ratio of the exhaust gas to the duty control unit. Thus, in any of a case when the tolerance of the purifying rate of the catalytic converter is set relatively widely with an engine output taken into consideration to a certain extent, and a case when the set range is shifted to a rich side of the air/fuel ratio with the engine output taken into serious consideration, the air/fuel ratio of the exhaust gas can be controlled properly to a desired target value.

U.S. Pat. No. 5,546,919, which issued to Iida et al. on Aug. 20, 1996, describes an operating arrangement for a gaseous fueled engine. A feedback control system maintains an air/fuel ratio at a stoichiometric ratio by mixing air is with a gaseous fuel supply to the charge former. A manually controlled air bleed is incorporated to permit adjustment for deterioration in the system due to age or carbon deposits or the like. In addition, the feedback control position of the air bleed valve is memorized and the memorized value is utilized for control under some conditions when feedback control would not be appropriate such as for cold starting when the sensor is not at its operating temperature or upon the resumption of normal control after a fuel shut off during decell.

U.S. Pat. No. 5,425,232, which issued to Holtermann on Jun. 20, 1995, describes a marine propulsion device with means for supplying secondary air to catalytic converter. Disclosed is a marine propulsion device comprising a combustion chamber, an exhaust passage, an air pump and a three-way catalytic converter. The air pump pumps air into the exhaust passage at or immediately upstream of the catalytic converter. By this construction the internal combustion engine can be run slightly rich, but the catalytic converter will see a close to stoichiometric mixture so that the pollutants in the exhaust stream can be oxidized or reduced appropriately since the catalytic converter will be able to operate as a three-way catalytic converter.

U.S. Pat. No. 4,841,940, which issued to Uranishi et al. on Jun. 27, 1989, describes an air/fuel ratio control device of an internal combustion engine. The device comprises an electric air bleed control valve which controls the amount of air fed into the fuel passage of the carburetor so that an air/fuel ratio becomes equal to the stoichiometric air/fuel ratio. The degree of opening of the air bleed control valve is increased as an electric current fed into the air bleed control valve is increased. Fuel vapor is fed into the intake passages from the canister. When the electric current fed into the air bleed control valve is increased and reaches a predetermined upper limit due to the supply of purge gas, the current fed into the air bleed control valve is instantaneously increased by a fixed amount.

U.S. Pat. No. 4,593,663, which issued to Atago et al. on Jun. 10, 1986, describes a control apparatus for an internal combustion engine having a carburetor. The apparatus controls the air/fuel ratio of the air/fuel mixture supplied to the engine in the steady operating condition of the engine on the basis of predetermined data determined relative to the engine crankshaft rotation speed and intake vacuum and stored in a memory. A three-way catalyst purifies engine exhaust gases and an output signal from an oxygen sensor to the exhaust system is fed back for the control of the air/fuel ratio in the engine exhaust gases.

U.S. Pat. No. 4,363,209, which issued to Atago et al. on Dec. 14, 1982, describes an air/fuel control method and apparatus for internal combustion engines. It controls the air/fuel ratio of the fuel-air mixture supplied to the engine. The device also comprises a thermal reactor in which the exhaust gas from the engine is caused to undergo reaction with secondary air supplied to the reactor. It also comprises an oxygen sensor disposed in an exhaust gas passage between the reactor and three-way catalyst.

U.S. Pat. No. 4,121,546, which issued to Hattori et al. on Oct. 24, 1978, describes an air/fuel ratio adjusting apparatus for an internal combustion engine. The apparatus employs a gas sensor whose electric characteristic changes rapidly at near the stoichiometric air/fuel ratio so as to maintain the air/fuel ratio of mixture at any desired air/fuel ratio other than the stoichiometric one. A bypass valve is mounted in a bypass passage for supplying additional air to the portion of the carburetor downstream of its throttle valve.

U.S. Pat. No. 4,075,835, which issued to Hattori et al. on Feb. 28, 1978, describes an additional air control device. In controlling an amount of intake air of an internal combustion engine, an error due to the delay time between the time at which the air/fuel ratio changes in the intake system of the engine and the time at which a gas sensor in the exhaust system of the engine senses the changes is compensated. At least two delay factor detectors, e.g., an engine speed sensor and a pressure sensor control the driving and the stopping of the drive motor coupled to a control valve mounted in the additional air passage in the intake system to thereby adjust the amount of additional air supply.

U.S. Pat. No. 4,072,137, which issued to Hattori et al. on Feb. 7, 1978, describes an air-to-fuel ratio adjusting system for an internal combustion engine. The system comprises an additional air supply passage communicating with a carburetor of an internal combustion engine at the position downstream of its throttle valve, a control valve disposed in the additional air supply passage to vary the passage area thereof, and a percolation sensor for detecting percolation phenomenon of the fuel during idling operation of the engine. When the occurrence of a percolation phenomenon is determined in accordance with the output signal of the percolation sensor, the control valve is controlled in response to the output signal of an air/fuel ratio sensor, whereas the control valve is held in a predetermined valve position when there is no occurrence of percolation phenomenon during idling operation of the engine.

U.S. Pat. No. 4,046,118, which issued to Aono on Sep. 6, 1977, describes an air/fuel mixture control apparatus for carbureted internal combustion engines. Air/fuel mixture control apparatus for a carbureted internal combustion engine having air bleed and fuel supply passages comprises a detector for sensing pre-combustion data such as engine operating parameters and an exhaust gas sensor for providing post-combustion data. The pre-combustion data is used to control the fuel flow rate, while the post-combustion data controls the passage of air through the air bleed. The pre-combustion data minimize the delay from the instant of disturbance to the engine to the instant at which a response is observed.

The patents described above are hereby expressly incorporated by reference in the description of the present invention.

In many types of internal combustion engines, the internal configuration of an intake manifold and the shapes of its associated conduits connected to the cylinders of the engine result in an unequal and non-uniform distribution of the air/fuel mixture flowing from a carburetor toward the intake valves of the cylinders of the engine. As a result, each of the cylinders of the engine can receive a fuel-air mixture having a different air/fuel ratio than the other cylinders. This non-uniformity of air/fuel ratio at the intake valves of the cylinders can create a situation where a proper stoichiometric ratio is virtually impossible to achieve. As a result, the efficient operation of a catalyst, downstream from the cylinders, can be severely and adversely affected. It would therefore be significantly beneficial if the air/fuel mixture flowing into each of the cylinders can be maintained at a generally stoichiometric ratio throughout the operating range of the internal combustion engine.

SUMMARY OF THE INVENTION

A method for operating a marine engine, in accordance with a preferred embodiment of the present invention, comprises the steps of providing first and second valves disposed upstream from first and second cylinders of the engine, respectively. The first and second valves are connected in fluid communication between the first and second cylinders, respectively, and a source of air. A preferred embodiment of the present invention further comprises the step of providing a sensor, such as an oxygen sensor, disposed downstream from the first and second cylinders. The sensor provides an output signal which is representative of an exhaust gas characteristic, such as the stoichiometry of the air/fuel ratio of the fuel mixture flowing through the cylinders of the engine. The preferred embodiment further comprises the step of measuring the exhaust gas characteristic and controlling first and second magnitudes of first and second flows of air through is the first and second valves, respectively, in accordance with the exhaust gas characteristic measured by the sensor and also in accordance with a predetermined relationship between the first and second magnitudes of the first and second flows, respectively.

It should be understood that the concepts of the preferred embodiment of the present invention are applicable to internal combustion engines having any number of cylinders. Although described in significant detail herein in terms of two cylinders and two valves, it should be understood that the concepts of a preferred embodiment of the present invention can be used in accordance with engines with four, six or virtually any number of cylinders.

In a preferred embodiment of the present invention, the sensor is an oxygen sensor and the exhaust gas characteristic is representative of the stoichiometry of the air/fuel ratio of gas flowing into the cylinders. The output signal of the sensor has a first state, in a preferred embodiment of the present invention, which is representative of this air/fuel ratio being richer than stoichiometry and a second state which is representative of this air/fuel ratio being leaner than stoichiometry. The controlling step can comprise the steps of increasing the first magnitude and the second magnitude by a first differential magnitude when the output signal is in the first state and decreasing the first magnitude and the second magnitude by a second differential magnitude when the output signal is in the second state. The first and second differential magnitudes can be selected as percentages of the first and second magnitudes at the time immediately prior to the controlling step being performed. The predetermined relationship between the first and second magnitudes is predetermined as a function of the magnitude of load on the engine and an operating speed of the engine.

The predetermined relationship between the first and second magnitudes can be determined during a calibration procedure performed prior to normal use of the engine in a particularly preferred embodiment of the present invention. However, it should also be understood that the predetermined relationship can be altered during the operation of the internal combustion engine in response to the relationship between changes in the exhaust gas characteristic and the differential magnitude previously used. The present invention can further comprise the step of providing a carburetor upstream from the first and second valves which is calibrated to provide an air/fuel ratio which is richer than a stoichiometric air/fuel ratio.

In certain embodiments of the present invention, it can further comprise providing third and fourth valves disposed upstream from third and fourth cylinders of the engine. The third and fourth valves are connected in fluid communication between the third and fourth cylinders, respectively, and the source of air. The third and fourth magnitudes of the third and fourth flows of air through the third and fourth valves is accomplished in accordance with the exhaust gas characteristic measured by the sensor and also in accordance with a predetermined relationship, described above, between the third and fourth magnitudes. In an application of the present invention incorporating four cylinders and four valves, the carburetor is disposed upstream from the first, second, third and fourth valves.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
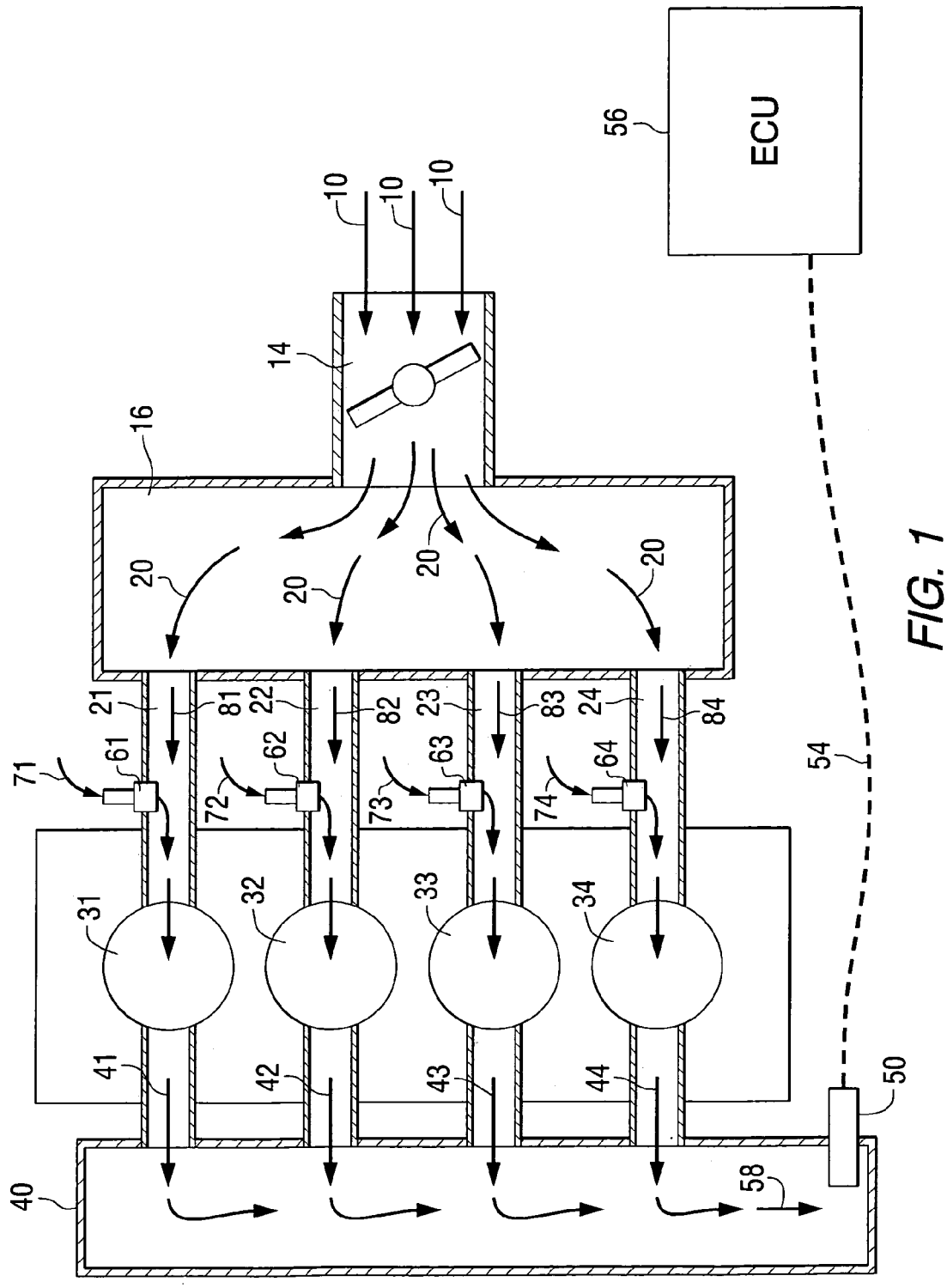
FIG. 1 is a schematic representation of a marine engine fuel system.

Throughout the description of the preferred embodiment of the present invention, like components will be identified by like reference numerals.

FIG. 1 is a highly simplified schematic representation of a marine engine. Incoming air, represented by arrows 10, flows through a carburetor 14 where it is mixed with fuel to create a richer than stoichiometric air/fuel ratio which flows into the plenum 16 of an intake manifold as represented by arrows 20. From the plenum 16 of the intake manifold, the air/fuel mixture is directed through individual conduits which conduct the air/fuel mixture to the intake valves of four cylinders, 31–34. After passing through the cylinders, 31–34, the resulting exhaust flows toward the exhaust manifold 40 as represented by arrows 41–44. A sensor 50 is disposed in the exhaust manifold 40 and configured to provide a signal, on line 54, to an engine control unit (ECU) 56 which comprises a microprocessor. In a preferred embodiment of the present invention, the sensor 50 is an oxygen sensor and is configured to provide a signal on line 54 which is binary in nature and is representative of whether the exhaust gas 58 flowing past the sensor 50 is richer or leaner than a stoichiometric air/fuel mixture would cause.

With continued reference to FIG. 1, four valves, 61–64, are connected to the four conduits, 21–24, and configured to allow a flow of air, represented by arrows 71–74, to flow from a source of air into the conduits, 21–24. The source of air is the ambient surroundings of the engine in a preferred embodiment of the present invention. In alternative embodiments, the air could be drawn from an air filter or flame arrestor. The air passing through each of the valves, 61–64, mixes with the air/fuel mixture, 81–84, flowing through the associated conduit, 21–24. The secondary air, 71–74, flowing through the valves, 61–64, has the effect of increasing the air/fuel ratio within the associated conduit, 21–24, and flowing into the associated cylinder, 31–34.

With continued reference to FIG. 1, the air/fuel mixture 20 flowing through the plenum 16 is not always equally distributed to the conduits, 21–24, which directs that air/fuel mixture toward the associated cylinders. As a result, the air/fuel mixture 81 flowing to the first cylinder 31 can be different than the air/fuel mixture flowing to any one of the other three cylinders illustrated in FIG. 1. This non-uniformity of the air/fuel ratio of these mixtures, 81–84, results from the internal configuration of the plenum and the overall geometry of the flow paths followed by the air/fuel mixture 20 as it passes from the carburetor 14 to the cylinders, 31–34.

During calibration procedures, the air/fuel ratio flowing to each cylinder, 31–34, is determined. This allows the engine to be calibrated in such a way that each valve, 61–64, is commanded to allow a predetermined amount of air, 71–74, to be induced to flow into the associated conduit, 21–24. This inducted secondary air flow increases the air/fuel ratio of the air/fuel mixture, 81–84, flowing to the associated cylinder, 31–34. This calibration process, and the different amounts of inducted secondary air provided by the four valves, 61–64, allows the air/fuel ratios flowing into each cylinder, 31–34, to be equalized. In addition, it allows the microprocessor of the engine control unit 56 to control the valves in such a way that each cylinder receives an air/fuel ratio that is either stoichiometric or very close to stoichiometry. In certain engine applications, a stoichiometric air/fuel ratio is approximately 14.65 and, if the carburetor 14 is calibrated to provide an air/fuel ratio that is richer than stoichiometry, the inducted secondary air for each cylinder can be controlled to result in that stoichiometric air/fuel ratio for each of the four cylinders, 31–34.

As an example of how the inducted secondary air, 71–74, to each cylinder can be used to achieve stoichiometry for each of the cylinders, a hypothetical example will be used. If it is determined during calibration that the air/fuel ratio flowing into the first cylinder 31 can achieve stoichiometry if the first valve 61 is opened to a degree which allows the flow through the first valve 61 to be approximately ten percent of maximum flow at engine idle speed, this value can be stored in the engine control unit 56. Continuing with this hypothetical example, a similar calibration procedure may determine that the second valve 62 requires an air flow which is twelve percent of maximum flow, the third valve 63 requires fourteen percent of maximum flow and the fourth valve 64 requires sixteen percent of maximum flow. Therefore, if the four valves, 61–64, are controlled to permit ten percent, twelve percent, fourteen percent, and sixteen percent of maximum flow, respectively, each of the four cylinders, 31–34, will receive a air/fuel mixture having an air flow ratio that is stoichiometric. Since the carburetor 14 is adjusted to provide a mixture which is richer than stoichiometric, the addition of the proper second air flow through the associated valves will make the air flow into the cylinders leaner and will achieve stoichiometry through the addition of the secondary air flow. This information relating to the configuration of each of the valves is stored in the engine control unit 56.

Figure 2:
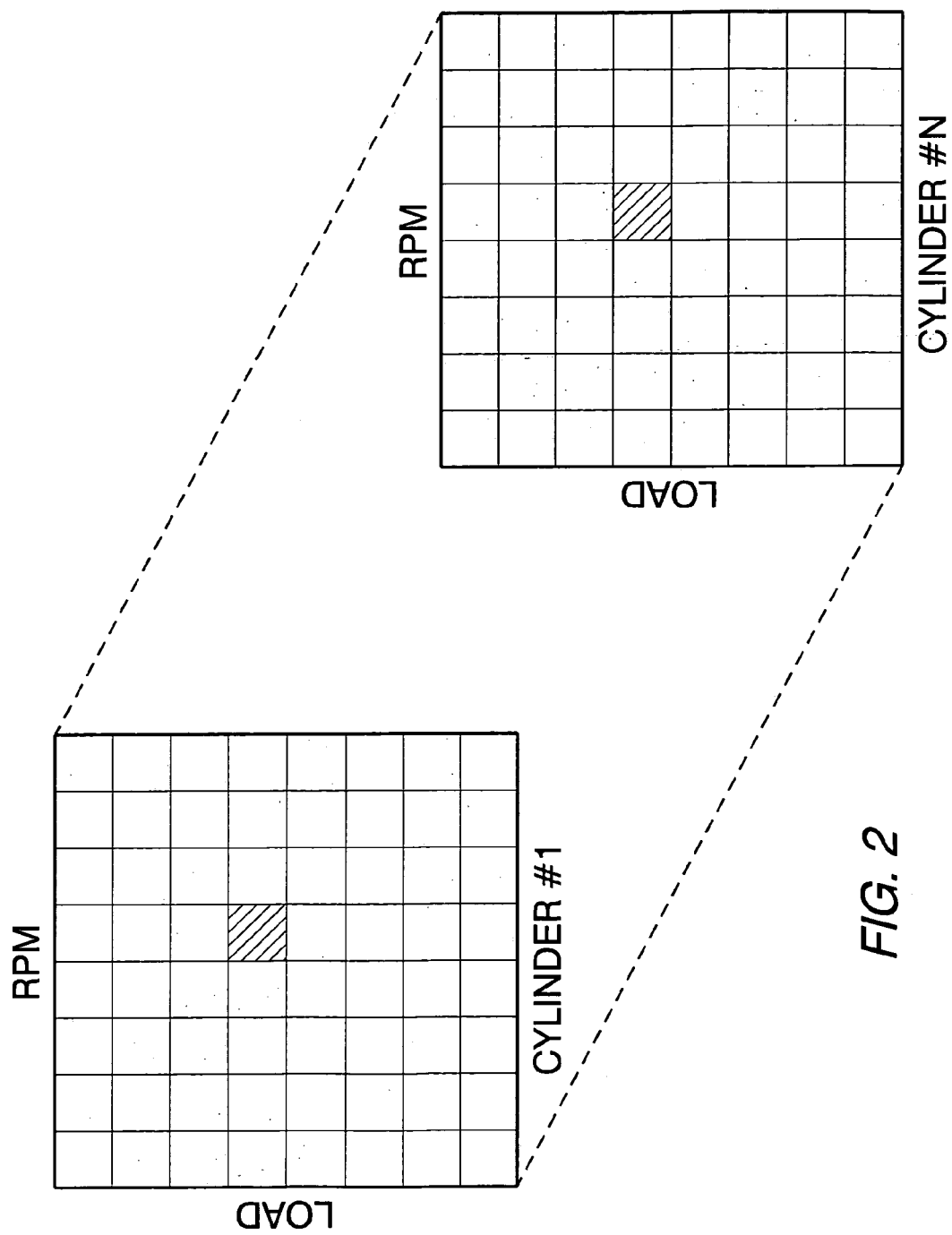
FIG. 2 shows a data storage procedure used in accordance with a preferred embodiment of the present invention.

FIG. 2 is a schematic representation of tables that store magnitudes of secondary air flow required for each cylinder and its associated valve. These magnitudes are stored as a function of engine speed (RPM) and the load on the engine. In FIG. 2, one specific combination of engine speed and load is identified by crosshatch. It should be understood that each cylinder will have its own stored table of data in a preferred embodiment of the present invention. Naturally, as the engine speed (RPM) and the load change, different values will be selected from the tables for each cylinder by the engine control unit 56. As these independent variables change during the operation of the engine, the engine control unit 56 will continuously select the appropriate air flow required through each of the valves, 61–64. When analog valves are used, this results in the engine control unit 56 providing commands to each valve which cause the valves to change the cross-sectional opening within the structure of the valves to regulate the amount of air, 71–74, flowing into the associated cylinder, 31–34.

With continued reference to FIGS. 1 and 2, the engine control unit receives a signal from the sensor 50, such as an oxygen sensor, which provides information as to whether or not the exhaust gas 58 represents a flow of air through the engine which is richer or leaner than a stoichiometric ratio. In a preferred embodiment of the present invention, the signal on line 54 is a binary signal which represents the state of the exhaust gas 58. If the signal on line 54 represents an air/fuel ratio that is leaner than stoichiometry, each of the valves, 61–64, will be controlled to decrease the amount of secondary air, 71–74, flowing through that valve. On the other hand, if the exhaust 58 represents an air/fuel ratio flowing through the engine which is too rich, each of the valves will be opened by a greater amount than their current status.

As a hypothetical example of the above-described procedure, the engine control unit 56, after receiving a signal on line 54 that the air/fuel ratio of the air/fuel mixture passing through the engine is too rich, may increase the opening of each valve to raise the air flow by ten percent. As an example, valve one will be opened to result in an air flow which is eleven percent of maximum, valve two will be controlled to increase the air flow through it to 13.2 percent, valve three will be controlled to increase the flow through it to 15.4 percent and valve four will be increased to 17.6 percent. In other words, each valve is controlled so that the flow through that valve is increased by ten percent. The relative flow through each of the valves is therefore maintained at the same relationship as before the increase in secondary inducted air flow. Alternatively, if the signal from the sensor 50 on line 54 indicates that the air/fuel ratio is too lean, the valve would be controlled by the engine control unit 56 to decrease the total flow through them. Since the signal provided by the sensor 50 is binary in nature, the engine control unit continuously increases or decreases the status of the valves. This results from the fact that the signal on line 54 represents a too lean or too rich condition of the air flowing through the engine. Although FIG. 1 does not show a connection between the engine control unit 56 and each of the valves, 61–64, it should be understood that the valves are controlled by signals provided by the engine control unit 56.

In an alternative configuration of the present invention, each of the valves, 61–64, can be opened or closed by a differential amount which is not a percentage of the current opening for the valve. In other words, the engine control unit 56 can add or subtract a fixed amount to each valve. An example of this could result in each of the four valves being increased by one percent of their maximum flow. Upon receiving a signal on line 54 that the air/fuel mixture is too rich, the first valve would therefore be increased to allow eleven percent of its maximum flow, the second valve 62 would be increased to allow thirteen percent of its maximum flow, the third valve 63 would be increased to allow fifteen percent of its maximum flow and the fourth valve 64 would be increased to allow seventeen percent of its maximum flow. However, as described above, a preferred embodiment of the present invention changes each of the valves, 61–64, by a percentage of their current air flow in response to an air/fuel ratio that is either too lean or too rich, as represented by a signal on line 54.

With continued reference to FIGS. 1 and 2, a particularly preferred embodiment of the present invention calibrates the carburetor 14 so that it is richer than stoichiometry. As an example, the carburetor 14 can be calibrated to provide an air/fuel ratio of approximately 13.0. The four valves, 61–64, are preferably located close to the intake valves of their associated cylinder, 31–34. A single oxygen sensor 50 is provided in the exhaust manifold 40 upstream from a catalytic converter. One of the primary goals of the present invention is to provide an exhaust stream 58 which results from a stoichiometric air flow ratio so that the catalytic converter operates efficiently. The engine control unit 56 receives the signal from the oxygen sensor 50 and outputs control signals to the air valves, 61–64. A data map, as illustrated in FIG. 2, is provided for each cylinder and provides information as a function of engine speed and load which allows the engine control unit 56 to determine the necessary air flow through each of the valves. This can be stored as a percentage of maximum air flow through each valve or as a required magnitude of an electrical signal provided to each valve to achieve the desired air flow, 71–74, to achieve a stoichiometric air/fuel ratio for each cylinder, 31–34. The amount of air flowing through each of the four valves, 61–64, is determined through a calibration procedure that strives to achieve stoichiometry for each cylinder.

It should be understood that, in a preferred embodiment of the present invention, the engine control unit 56 may operate differently than described above during certain conditions. This deviation would typically be temporary. For example, during a cold start and cold run operation, the engine will operate in a normal manner relating to the carburetor choking system. The carburetor main fueling process would result in an air/fuel ratio of approximately 13.0. After the engine systems have stabilized, the present invention will be operated in a closed loop manner as described above. The engine control unit 56 will monitor the sensor 50 and will respond to a rich or lean condition. When a rich signal is received, each of the valves, 61–64, will be opened by a predefined amount so that a quantity of air will flow through each valve to bring the air/fuel ratio up to a magnitude which will result in an exhaust 58 that is leaner than a stoichiometric ratio. When this occurs, the signal on line 54 will indicate a lean mixture and the engine control unit will respond by closing each valve by a preselected amount to once again result in a rich air/fuel ratio. As a result, the engine control unit 56 will attempt to control the valves, 61–64, in a manner that results in a continual perturbation of the signal received from the oxygen center 50. By continually causing lean and rich conditions to alternate, the engine control unit 56 can maintain a generally stoichiometric ratio for all engine speeds and loads.

Although the present invention has been described with particular specificity and illustrated to show a preferred embodiment, it should be understood that alternative embodiments are also within its scope.

I claim:

1. A method for operating a marine engine, comprising the steps of:
   providing a first valve disposed upstream from a first cylinder of said engine, said first valve being connected in fluid communication between said first cylinder and a source of air;
   providing a second valve disposed upstream from a second cylinder of said engine, said second valve being connected in fluid communication between said second cylinder and said source of air;
   providing a sensor disposed downstream from said first and second cylinders, said sensor providing an output signal which is representative of an exhaust gas characteristic;
   measuring said exhaust gas characteristic; and
   controlling a first magnitude of a first flow of air through said first valve and a second magnitude of a second flow of air through said second valve in accordance with said exhaust gas characteristic and in accordance with a predetermined relationship between said first and second magnitudes.

2. The method of claim 1, wherein:
   said sensor is an oxygen sensor.

3. The method of claim 1, wherein:
   said exhaust gas characteristic is representative of an air/fuel ratio of gas flowing into said first and second cylinders.

4. The method of claim 3, wherein:
   said output signal has a first state which is representative of said air/fuel ratio being richer than stoichiometry and a second state which is representative of said air/fuel ratio being leaner than stoichiometry.

5. The method of claim 4, wherein:
said controlling step comprises the steps of increasing said first magnitude and said second magnitude by a first differential magnitude when said output signal is in said first state and decreasing said first magnitude and said second magnitude by a second differential magnitude when said output signal is in said second state.

6. The method of claim 5, wherein:
said first and second differential magnitudes are selected as percentages of said first and second magnitudes at the time prior to said controlling step being performed.

7. The method of claim 1, wherein:
said predetermined relationship between said first and second magnitudes is predetermined as a function of the magnitude of load on said engine and an operating speed of said engine.

8. The method of claim 1, wherein:
said predetermined relationship between said first and second magnitudes is determined during a calibration procedure performed prior to normal use of said engine.

9. The method of claim 1, further comprising:
providing a carburetor upstream from said first and second valves.

10. The method of claim 9, wherein:
said carburetor is calibrated to provide an air/fuel ratio which is richer than a stoichiometric air/fuel ratio.

11. The method of claim 1, further comprising:
providing a third valve disposed upstream from a third cylinder of said engine, said third valve being connected in fluid communication between said third cylinder and said source of air;
providing a fourth valve disposed upstream from a fourth cylinder of said engine, said fourth valve being connected in fluid communication between said fourth cylinder and said source of air; and
controlling a third magnitude of a third flow of air through said third valve and a fourth magnitude of a fourth flow of air through said fourth valve in accordance with said exhaust gas characteristic and in accordance with a predetermined relationship between said third and fourth magnitudes.

12. The method of claim 11, further comprising:
providing a carburetor upstream from said first, second, third and fourth valves.

13. A method for operating a marine engine, comprising the steps of:
providing a first valve disposed upstream from a first cylinder of said engine, said first valve being connected in fluid communication between said first cylinder and a source of air;
providing a second valve disposed upstream from a second cylinder of said engine, said second valve being connected in fluid communication between said second cylinder and said source of air;
providing a third valve disposed upstream from a third cylinder of said engine, said third valve being connected in fluid communication between said third cylinder and said source of air;
providing a fourth valve disposed upstream from a fourth cylinder of said engine, said fourth valve being connected in fluid communication between said fourth cylinder and said source of air;

providing a sensor disposed downstream from said first and second cylinders, said sensor providing an output signal which is representative of an exhaust gas characteristic;
measuring said exhaust gas characteristic; and
controlling a first magnitude of a first flow of air through said first valve, a second magnitude of a second flow of air through said second valve, a third flow of air through said third valve and a fourth magnitude of a fourth flow of air through said fourth valve in accordance with said exhaust gas characteristic and in accordance with a predetermined relationship among said first, second, third and fourth magnitudes.

14. The method of claim 13, wherein:
said sensor is an oxygen sensor and said exhaust gas characteristic is representative of an air/fuel ratio of gas flowing into said first and second cylinders.

15. The method of claim 14, wherein:
said output signal has a first state which is representative of said air/fuel ratio being richer than stoichiometry and a second state which is representative of said air/fuel ratio being leaner than stoichiometry.

16. The method of claim 15, wherein:
said controlling step comprises the steps of increasing said first, second, third and fourth magnitudes by a first differential magnitude when said output signal is in said first state and decreasing said first, second, third and fourth magnitudes by a second differential magnitude when said output signal is in said second state.

17. The method of claim 16, wherein:
said first and second differential magnitudes are selected as percentages of said first, second, third and fourth magnitudes at the time immediately prior to said controlling step being performed.

18. The method of claim 17, wherein:
said predetermined relationship among said first, second, third and fourth magnitudes is predetermined as a function of the magnitude of load on said engine and an operating speed of said engine.

19. The method of claim 18, wherein:
said predetermined relationship among said first, second, third and fourth magnitudes is determined during a calibration procedure performed prior to normal use of said engine.

20. The method of claim 19, further comprising:
providing a carburetor upstream from said first and second valves, said carburetor being calibrated to provide an air/fuel ratio which is richer than a stoichiometric air/fuel ratio.

21. A method for operating a marine engine, comprising the steps of:
providing a first valve disposed upstream from a first cylinder of said engine, said first valve being connected in fluid communication between said first cylinder and a source of air;
providing a second valve disposed upstream from a second cylinder of said engine, said second valve being connected in fluid communication between said second cylinder and said source of air;
providing a third valve disposed upstream from a third cylinder of said engine, said third valve being connected in fluid communication between said third cylinder and said source of air;
providing a fourth valve disposed upstream from a fourth cylinder of said engine, said fourth valve being connected in fluid communication between said fourth cylinder and said source of air;

providing a oxygen sensor disposed downstream from said first and second cylinders, said oxygen sensor providing an output signal which is representative of an exhaust gas characteristic, said output signal having a first state which is representative of said air/fuel ratio being richer than stoichiometry and a second state which is representative of said air/fuel ratio being leaner than stoichiometry;

measuring said exhaust gas characteristic;

providing a carburetor upstream from said first and second valves, said carburetor being calibrated to provide an air/fuel ratio which is richer than a stoichiometric air/fuel ratio; and controlling a first magnitude of a first flow of air through said first valve, a second magnitude of a second flow of air through said second valve, a third flow of air through said third valve and a fourth magnitude of a fourth flow of air through said fourth valve in accordance with said exhaust gas characteristic and in accordance with a predetermined relationship among said first, second, third and fourth magnitudes.

22. The method of claim 21, wherein:

said controlling step comprises the steps of increasing said first, second, third and fourth magnitudes by a first differential magnitude when said output signal is in said first state and decreasing said first, second, third and fourth magnitudes by a second differential magnitude when said output signal is in said second state.

23. The method of claim 22, wherein:

said first and second differential magnitudes are selected as percentages of said first, second, third and fourth magnitudes at the time immediately prior to said controlling step being performed, said predetermined relationship among said first, second, third and fourth magnitudes being predetermined as a function of the magnitude of load on said engine and an operating speed of said engine, said predetermined relationship among said first, second, third and fourth magnitudes being determined during a calibration procedure performed prior to normal use of said engine.

* * * * *